United States Patent Office 3,388,119
Patented June 11, 1968

3,388,119
NON-FIBROUS PARTICULATE CELLULOSE AND
METHOD OF MAKING SAME
Mamerto M. Cruz, Jr., Pennington, N.J., assignor to
FMC Corporation, Philadelphia, Pa., a corporation
of Delaware
No Drawing. Filed July 19, 1965, Ser. No. 473,185
7 Claims. (Cl. 260—212)

ABSTRACT OF THE DISCLOSURE

Particulate, non-fibrous cellulose product formed by subjecting cellulose to the action of a hydrolyzing mixture comprising a non-derivatizing acid, water and a water-miscible cellulose swelling inhibitor. The dry cellulose product is not hornified, when placed on the tongue produces a sensation of dissolving, is readily frangible and, upon attrition in an aqueous medium, forms a stable dispersion. The amount of dispersible particles and the viscosity of the dispersion increase as the period of attrition increases.

---

This application is a continuation-in-part of application Serial No. 147,477, filed October 25, 1961, now abandoned.

This invention relates to improvements in the hydrolysis of cellulose and to products resulting therefrom.

The preparation of acid-insoluble residues by the acid hydrolysis of cellulose is described in U.S. Patent 2,978,446, issued Apr. 4, 1961, which also discloses a step of attriting the residues in water to form stable dispersions and gels.

The present invention is directed to improvements in the degradation of the cellulose so as to provide a new and novel non-fibrous form of cellulose by means of a new hydrolytic degradation method.

As is known, cellulose is made up of closely spaced linear chains or molecules. For the most part, these chains exhibit a regular lateral spacing, one with respect to another, but here and there the spacing is irregular. The regular spacing is sometimes described as lateral order, generally considered crystalline, and the irregular spacing as lateral disorder generally considered amorphous. The amorphous portions are more accessible to aqueous hydrolyzing acids while the crystalline portions are less accessible and are not easily attacked.

According to the invention, the hydrolytic degradation of the cellulose is affected in the presence of an anti-swelling agent or swelling inhibitor for the cellulose, it having been discovered that such treatment effects a more complete removal of the amorphous portions as well as the mesocrystalline or partially crystalline portions thereby producing a completely non-fibrous product having distinctive properties. Mesocrystalline portions, i.e., areas of partial crystallinity, are removed along with the amorphous portions; and recrystallization of the hydrolyzed product is minimized. The non-fibrous product upon being attrited in water produces continuously increasing amounts of highly dispersible particles with increasing time of attrition; the particles in the resulting dispersion become quite small, substantially all of them being reduced to a size of less than 5 microns, or, at the outside, less than 10 microns. Even without attrition, the non-fibrous product has high proportions of dispersible particles, that is, particles that are suspendable in water or other liquid media and which remain in homogeneous suspension for an indefinite time. Owing to its remarkable dispersibility, the non-fibrous product is edible, has excellent utility in foods; it not only has a perfectly smooth, bland mouth feel but leaves no detectable aftertaste or residual effect. Other utilities and advantages will be apparent from the description which follows.

The method of the invention comprises subjecting an alpha-cellulose-containing cellulosic source material to the action of a hydrolyzing acid mixture at a temperature and for a time sufficient to produce an acid-insoluble residue comprising non-fibrous cellulose in a state of inhibited swelling, meaning any degree of inhibited swelling. The time of the reaction varies inversely with the temperature. The hydrolyzing mixture comprises a non-derivatizing acid, limited amounts of water and an at least partially water-miscible non-aqueous swelling inhibitor for cellulose; that is, a liquid agent which exerts an anti-swelling effect on the source material and especially on the resulting non-fibrous product and which remains in the liquid state under reaction conditions. The swelling inhibitor also provides for a required bulk of liquid necessary for the treatment of the cellulose and eliminates a large bulk of water thereby increasing the effective concentration of the hydrolyzing acid. During the reaction, the formed non-fibrous cellulose is protected against mechanical attrition, as by carrying out the reaction under quiescent conditions. Coincidently with the formation of non-fibrous cellulose, water-soluble and water-insoluble by-products are formed which dissolve in the water and swelling inhibitor components, respectively, of the hydrolyzing mixture. The non-fibrous product is washed to remove any acid and by-products therefrom, after which it may be used in the wet state or dried.

While the invention is not to be limited by theory, it is considered that the principal effect of the anti-swelling agent or swelling inhibitor is to maintain the starting cellulose and the non-fibrous product in an at least partially unswelled state during the reaction, in distinction to the use of water which, by itself, produces swelling. The anti-swelling effect is throught to be a partial one, although the effect on the product is much greater than on the starting cellulose. The reaction, of course, comprises the attack of the amorphous and mesocrystalline portions by the acid solution and the removal of such portions from the original cellulosic material. More specifically, the swelling inhibitor opposes swelling of the non-fibrous product and, in fact, is believed to also attack and possibly remove the mesocrystalline portions which are present within the crystalline portions so that on subsequent attrition of the recovered non-fibrous product many more particles, and of smaller and more uniform size, will be formed as compared to the attrition of the product obtained by subjecting the starting cellulose to an aqueous hydrolyzing acid solution in the absence of a swelling inhibitor. In the attrited product, there is a total absence of large fibrous cellulose. Another factor favoring the formation of finer particles is that during hydrolysis, recrystallization is greatly minimized, as compared to aqueous hydrolysis systems in the absence of the swelling inhibitor thereby resulting in non-fibrous particles of smaller size; in other words, owing to the thorough removal of the amorphous and mesocrystalline fractions of the original cellulose, the tendency of agglomerates to form larger particles is substantially prevented by the presence of the inhibitor. Consequently, the crystalline fractions are more loosely disposed, relatively to one another, than in the absence of the inhibitor, and hence form smaller particles which disperse more easily in water, giving gels of unusual smoothness. The water component of the hydrolyzing acid mixture serves to maintain the acid in solution, and to dissolve water-soluble by-products; its normal swelling effect on the aggregates is opposed by the inhibitor.

The source material or starting cellulose may be a natural or native cellulose, such as, for example, ramie, cotton, purified cotton, refined wood pulps, refined straws and grasses and the like or may be an alkali-swollen form of cellulose, or may be a regenerated cellulose, such as, for example, rayon, cellophane and the like. The alpha-cellulose content should be at least 80% by weight.

The hydrolyzing acid mixture contains, per part by weight of alpha-cellulose in the cellulosic source material, of about 0.15 to 8 parts, preferably 0.2 to 7 parts, of water and about 2.9 to 12 parts, preferably 3 to 11 parts, of the swelling inhibitor. The weight ratio of swelling inhibitor to water is maintained in the range of 0.3:1 to 52:1, preferably 0.5:1 to 33:1; if refluxing temperatures are employed, the weight ratio may be as high as 60:1. The amount of acid does not vary relatively to the alpha-cellulose as much as the water or swelling inhibitor; being about 0.05 to 0.5, preferably 0.15 to 0.5 part of acid per part of alpha-cellulose. In terms of the acid-water mixture or solution, the acid may vary from 0.04 to 0.80 part, preferably 0.06 to 0.6 part, of acid per part of the acid-water solution. The consistency of the mixture or reaction slurry, that is, the solids content, may range from 1 to 75%, but is preferably from 8 to 14% by weight. The amount of acid used may be in the lower portion of the range when the reaction is conducted under pressure and higher temperatures.

The hydrolyzing agent is preferably a non-derivatizing acid, particularly a halogen acid, viz., hydrochloric, hydrobromic, hydriodic, or hydrofluoric acid. Other suitable acids are sulfurous, iodic, boric, fluoboric, or fluosilicic acids. Also, alkyl and aryl sulphonic and sulfinic acids, tosylsulphonic acid, tosylsulfonamide, and the like. Mixtures of two or more of the foregoing may be used. Other satisfactory agents are acid salts such as sodium bisulfate, sodium bisulfite, sodium dihydrogen phosphate, potassium bisulfate, potassium bisulfite, lithium bisulfate, potassium dihydrogen phosphate, and salts of the foregoing sulphonic and sulfinic acids. Mixtures of sulfur dioxide with hydrochloric, sulfuric, or any of the other named acids are also satisfactory as well as mixtures of salts and acids.

The anti-swelling agents or swelling inhibitors are non-aqueous oxygen-containing organic compounds comprising alcohols, ethers, esters, ketones, lactones, organic acids, polyols including glycols and triols, glycol-ethers, etc. The compounds have general solvent properties and are preferably entirely miscible in water but may also be partially miscible, at least to the extent of 1% and preferably at least 5% by weight. Where water miscibility of a compound is below these ranges, it is possible to mix the compound with one of greater miscibility, so that the mixture is at least 1% miscible with water, and to employ the mixture. The agents should have a boiling point which enables them to remain in the liquid phase under the conditions of the reaction, especially at temperatures of 50° to 200° C.; preferably the boiling point should be such as to permit convenient recovery as by distillation at temperatures below 200° C. Under the conditions of the reaction, the agents have no derivatizing effect on the original cellulose or the non-fibrous product. As indicated, the agents act to inhibit swelling of the molecular chains; more particularly, they help prevent distention of the chains laterally of each other, or in other words, they help maintain the interchain distances more or less constant.

Useful swelling inhibitors include alcohols, preferably low molecular weight aliphatic alcohols having 2 to 6 carbon atoms, but also including aromatic alcohols, such as, for example, ethanol, isopropanol, butanol, isobutanol, and pentanol. Examples of satisfactory alkyl ethers are methyl and ethyl ethers, dioxane, and compounds of the beta-alkoxyethanol series where the alkoxy group may be methoxy, ethoxy, propoxy, butoxy, etc. These latter compounds are actually glycol-ethers. Polyols, such as alkylene glycols and triols are other satisfactory compounds and include ethylene, diethylene, triethylene, propylene, and dipropylene glycols, the various pentanediols and hexanediols, and hexanetriols. Examples of satisfactory alkyl esters of low molecular weight saturated and unsaturated acids are ethyl and isopropyl acetate, methyl ester gamma-ethoxy propionic acid, ethylene glycol diacetate, ethyl acetoacetate, diethyl maleate, diethyl succinate, ethyl acrylates, etc. Aliphatic acids, preferably having 2 to 6 carbon atoms, which are satisfactory are formic, acetic, acrylic, propionic, butyric, and caproic acids. Alkyl and aryl ketones such as, for example, acetone, mesityl oxide, diethyl ketone, methyl ethyl and methyl propyl ketones, diacetone alcohol, diisobutyl ketone, acetyl acetone, cyclohexanone, cyclopentanone, acetophenone, etc. are also satisfactory.

The temperature of the reaction is preferably 50° C. to 90° C., although it may be as high as 200° C., the lower temperatures being preferred. Reaction time varies inversely with the temperature and may extend from 1 or 2 to 20 or more hours although the shorter times are preferred. Also, the non-fibrous characteristics increase as reaction time increases. The pressure is preferably atmospheric but may range to about 30 p.s.i.g. or more.

The reaction is carried out preferably with mild mechanical agitation to improve heat transfer and minimize particle size reduction. One means of mild agitation of the reaction mass is by bubbling an inert gas like nitrogen through the mass.

At the conclusion of the reaction, the solids are separated as by filtration, centrifuging, or the like. Filtration is the usual procedure, giving a darkly-colored filtrate comprising water, swelling inhibitor and breakdown products of the amorphous portions of the original cellulose. It may be noted that the swelling inhibitor acts to dissolve from the reaction mixture any water-insoluble extractable materials such as resinous materials and thus helps to purify the products. The product is washed with water to remove acid, swelling inhibitor, and any water-soluble products not previously removed.

The product may be dried by any desired method such as in air at room temperature or higher using conventional tunnel or oven dryers. Another procedure is to displace the water in the wet product preferably by means of a low boiling, water-miscible organic compound such as a low molecular weight aliphatic alcohol such as methanol, ethanol, propanol, isopropanol, etc., and then to evaporate off the compound. Spray drying either in air or in a vacuum is also satisfactory. Drum drying and freeze drying are other suitable procedures, favoring the development of a porous material. A distinctive property of the product is that it can be dried at elevated temperature; that is, at temperatures as high as 110° C., without hornification; that is, the product dried at elevated temperatures is not hard, difficult to break, or difficult to disperse in water to form extremely smooth, non-chalky-tasting gels. On the other hand, products prepared by aqueous hydrolysis in the absence of a swelling inhibitor exhibit hornification; that is, the product is very hard, cannot be readily broken down in size and is difficult to disperse in water, dispersion and gels which are formed being chalky to the taste and upon standing exhibit some separation of water.

The dried non-fibrous particles have a particle size of less than 1 to 200 microns; they are fractionatable by conventional procedures, such as mechanical sifting, settling in water, or centrifuging, into fractions of any desired particle size, including fractions of up to 0.2, 0.5, 1, 2, 5, 10 or more microns. If desired, fractions of wider sizes are obtainable, such as below 40, 50, 100 or 200 microns or of 10 to 100 microns, 50 to 200 microns, etc.

The dried product has an ether-extractable content of a very low order, about 0.04% by weight or less; by comparison, dried products prepared by acid hydrolysis in the absence of the swelling inhibitor generally have an ether-extractable content of 0.12% and more. Chemically, the product consists of at least 96% by weight of anhydroglucose units and is capable of being purified to at least 99% purity. Ash content is usually less than 50 p.p.m., but if the reaction and particularly the washing, is done with distilled water, the ash may be below 12 p.p.m.

The dried non-fibrous product is distinguished by the ease and rapidity with which the particles are wetted by water and when subsequently dried, they are again recoverable in discrete non-hornified form. Under the microscope the particles are seen to have a plurality of surface cracks, fissures, voids, etc. When tasted, the rapid wettability of the particles is evident, and the taste is bland and free of aftertaste. Upon placing a small mass of the product on the tongue, the mass produces a sensation of dissolving without leaving a residual aftertaste. Although described as dry, the product may contain a few percent moisture, the moisture regain upon exposure to the atmosphere being 4 to 5% by weight.

The ability of the aggregates to form gels is unique. Gel formation is simple and rapid. Water is added to the wet or dried product so as to form a mixture of about 40% consistency and the mixture is agitated in a conventional mixing device, such as an electrically operated egg beater, mixer, or similar device, to form a dough. The dough is diluted with water to a consistency of less than about 30% and mixing is continued to form the gel. Each mixing step is carried out for only a few minutes, say 1 to 5 or 6 minutes. The resulting gel is of creamy smoothness, both to the eye and the taste, and is free of residual aftertaste and syneresis effects. If desired, mixing or attriting of the product can be done in a non-aqueous medium comprising one or more water-miscible oxygen-containing compounds, preferably hydroxy- and carbonyl-containing compounds. Hydroxy compounds are a preferred class, particularly polyols, comprising aliphatic compounds having two or more hydroxy groups, of which glycerol is an example. Water-miscible, low molecular weight alcohols comprise a suitable class, as do organic acids, esters, aldehydes and ketones. Other compounds are ethers and oxides like ethylene oxide, propylene oxide, and dioxane. Aqueous sugar solutions are useful. Water may also be added to any of the foregoing compounds.

In aqueous gel form, the non-fibrous particles are in a finely divided, highly dispersed non-agglomerated state. It is considered that when initially subjected to attrition, the non-fibrous particles are rapidly reduced in size to a fine state of subdivision, the presence of the cracks and fissures providing weak or breaking points in the particles. As attrition proceeds, further reduction in particle size occurs accompanied by hydration, thus favoring the production of highly stable homogeneous gels of cream-like texture. The gels are unique in respect to the continuous breakdown or reduction of the larger to the finer particles which continues during attrition over a substantial period of time. As illustrated in Example 11, the continuous breakdown of particles during attrition means that gel formation is independent of attrition time; it also means that agglomeration or reaggregation does not occur, so that the mouth feel and taste of the resulting gel will not be affected by the presence of agglomerated particles. By comparison, and as demonstrated in this example, gels made from cellulose crystallite aggregates prepared in the absence of the swelling inhibitor do not exhibit continuous breakdown of the particles during attrition over a comparable period; rather, the breakdown soon reaches a maximum and then decreases, indicating the occurrence of agglomeration or reaggregation.

The advantage of continuous breakdown of particles is also obtained when the attrition is performed in the presence of sodium and chloride ions, and also in the added presence of acetic acid, note Example 12, thus demonstrating the value of the gels in food recipes containing table salt as a seasoning agent and in spreads such as salad dressings and mayonnaise which contain salt and are on the acid side.

In terms of dispersibility, it is estimated that the gels have at least 40% greater dispersibility than those stemming from cellulose crystallite aggregates prepared in the absence of a swelling inhibitor. Owing to the presence of only the finer particles, the gels have a relatively low viscosity, much lower than that of gels derived from aggregates prepared in the absence of a swelling inhibitor. Note Example 13. As is thus apparent, the present gels have improved flowability and allow more solids in a given food recipe, particularly semi-solid foods like spreads, without changing the usual viscosity or flow characteristics of the food.

The superior dispersibility of the aggregates is apparent in the case of dilute slurries as well as the more concentrated gels, as illustrated in Examples 9 and 10.

The invention may be illustrated by the following examples.

Example 1

Ketchikan sulfite wood pulp, having a moisture content of 5% by weight and, on the dry basis, an alpha-cellulose content of 93% by weight, was added to a mixture of isopropanol-aqueous HCl solution to form a slurry of approximately 10% consistency (10 parts by weight of pulp in 100 parts by weight of liquid).

On a weight basis, 449 g. of the pulp were taken, corresponding to 398 g. alpha-cellulose. The aqueous HCl solution contained 36.5% HCl, specific gravity of 1.19, and corresponded to 196 g. of dry HCl. The total water present, including that from the pulp, was 363 g., and the isopropanol amounted to 3179 g. The following weight ratios were calculated:

| | |
|---|---|
| Isopropanol:water | 8.78 |
| HCl:HCl plus water | .172 |
| Water:alpha-cellulose | .912 |
| HCl:alpha-cellulose | .492 |
| Isopropanol:alpha-cellulose | 7.99 |

The slurry was heated to 72° C. in a constant temperature bath and maintained at such temperature under quiescent or non-stirring conditions for 17 hours at atmospheric pressure, then filtered, and the solid residue washed with distilled water, broken up, washed again with distilled water until free of acid, then washed with isopropanol and spray dried. The purified non-fibrous cellulose product had an ash content of 12 p.p.m. The material was identified as Sample No. 1492–14 for future reference. A small mass of the dried product (size of a large pea) when placed on the tongue produced a sensation of dissolving without producing a chalky mouth feel and without leaving a residual aftertaste or lingering sensation either before or after swallowing.

Example 2

Ketchikan sulfite wood pulp as used in Example 1 was added to a mixture of isopropanol-aqueous HCl solution to form a slurry of approximately 10% consistency. Six hundred g. of the pulp were taken, corresponding to 530 g. alpha-cellulose. The aqueous HCl solution contained 36.5% HCl, sp. gr. of 1.19, and corresponded to 261 g. of dry HCl. Total water, including that from the pulp, was 483 g., and the isopropanol was 4239 g. The following weight ratios were calculated:

| | |
|---|---|
| Isopropanol:water | 8.78 |
| HCl:HCl+water | .351 |
| Water:alpha-cellulose | .910 |
| HCl:alpha-cellulose | .492 |
| Isopropanol:alpha-cellulose | 7.99 |

The over-all mixture was heated to 72° C. under quiescent conditions for 17 hours at atmospheric pressure, then purified as in Example 1. The purified residue was air dried at 110° C. and identified as Sample No. 1492–18. A small mass of the dried product (size of a large pea) when placed on the tongue produced a sensation of dissolving without producing a chalky mouth feel and without leaving a residual aftertaste or lingering sensation either before or after swallowing.

Example 3

Several batches were prepared at various isopropanol:water (isopr:water) ratios, using the same wood pulp and general procedure employed in Example 1. The reaction temperature in each case was 72° C., the reaction time 17 hours, and the pressure 1 atmosphere; except that in the last three runs (Nos. 1504–114, 1504–115, and 1504–123) the reaction mixture was steeped for 16 hours at room temperature and then refluxed for 3 hours. The residues were air dried at 110° C. The pertinent data are as follows, it being understood that all of the weight ratios listed are to be followed by ":1" or "to 1":

| Sample No. | Weight Ratios | | | | |
|---|---|---|---|---|---|
| | Isopr: Water | HCl: HCl plus water | HCl: alpha-cell. | Isopr: alpha-cell. | Water: alpha-cell. |
| 1504–78 | 0.39 | .06 | .48 | 2.96 | 7.60 |
| 1504–102 | 0.54 | .07 | .49 | 3.56 | 6.57 |
| 1504–79 | 0.96 | .08 | .46 | 4.44 | 5.70 |
| 1504–101 | 1.24 | .10 | .49 | 5.34 | 4.31 |
| 1492–78 | 1.74 | .11 | .35 | 4.93 | 2.82 |
| 1492–79 | 3.44 | .17 | .35 | 6.02 | 1.74 |
| 1492–77 | 8.78 | .25 | .49 | 7.99 | 0.92 |
| 1492–80 | 12.81 | .38 | .34 | 7.20 | 0.56 |
| 1504–112 | 24.0 | .55 | .39 | 8.16 | .34 |
| 1504–113 | 32.7 | .62 | .39 | 8.16 | .25 |
| 1492–85* | 57.3 | .73 | .35 | 7.62 | .13 |
| 1504–114 | 24.0 | .55 | .39 | 8.14 | .34 |
| 1504–115 | 32.7 | .62 | .39 | 8.14 | .25 |
| 1504–123 | 60.0 | .77 | .50 | 8.81 | .15 |

All samples except * are non-fibrous. Sample 1492–85 exhibited a slightly fibrous character. A small mass of the dried products (size of a large pea) when placed on the tongue produced a sensation of dissolving without producing a chalky mouth feel and without leaving a residual aftertaste or lingering sensation either before or after swallowing.

Example 4

Using the general procedure of Example 1, two batches were prepared using ethylene glycol and methyl "Cellosolve" (MeOEtOH) as the swelling inhibitor. The following ratios were calculated:

| | Ethylene glycol | Methyl "Cellosolve" |
|---|---|---|
| Swelling inhibitor:water, by wt | 12.41:1 | 10.78:1 |
| HCl:HCl + water | .35:1 | .35:1 |
| Water:alpha-cellulose | .91:1 | .91:1 |
| HCl:alpha-cellulose | .49:1 | .49:1 |
| Swelling inhibitor:alpha-cellulose | 11.33:1 | 9.84:1 |

In each case, the reaction temperature was 72° C., the pressure was atmospheric, and the reaction time was 17 hours. A small mass of the dried products (size of a large pea) when placed on the tongue produced a sensation of dissolving without producing a chalky mouth feel and without leaving a residual aftertaste or lingering sensation either before or after swallowing.

Example 5

Following the general procedure of Example 1, wood pulp as used in that example was treated with aqueous HCl solution in the presence of acetic acid as the swelling inhibitor. The following quantities were employed: 300 g. of pulp (corresponding to 265 g. of dry alpha-cellulose), 131 g. HCl, 242 g. total water, and 2832 g. of acetic acid. Weight ratios were calculated as follows:

Acetic acid:water _____ 11.7:1
HCl:HCl plus water _____ .35:1
Water:alpha-cellulose _____ .91:1
HCl:alpha-cellulose _____ .49:1
Acetic acid:alpha-cellulose _____ 10.7:1

The reaction temperature was 72° C. and the pressure atmospheric. Samples were taken after 2 and 3 hours. A small mass of the dried products (size of a large pea) when placed on the tongue produced a sensation of dissolving without producing a chalky mouth feel and without leaving a residual aftertaste or lingering sensation either before or after swallowing.

Example 6

The behavior of the non-fibrous product to attrition was examined by adding slowly 86 ml. of water to 67.5 g. of the non-fibrous cellulose in a Model N–50 Hobart mixer. The product was Sample No. 1492–14 of Example 1 and was in dry powdered form. A very cohesive doughlike mass (42.4% consistency) formed in the mixer after attrition for a total time of 25 minutes. During attrition, samples were removed at 5-minute intervals for examination under the microscope and the examination showed no evidence of agglomeration over the 25-minute period. Examination also showed that the particle size of the attrited material was in the range of 1 to 10 microns with the great majority of the particles being in the range of 5 microns and below.

To illustrate the formation of a gel, about 46 g. of the dry powdered non-fibrous cellulose were placed in the bowl of a conventional electrical household type mixer (Mixmaster). A total of 70 ml. of water was slowly added to the mass with stirring. After becoming wetted, the powder gradually balled up, and after agitation for 2.5 minutes the mix, comprising approximately 40% solids, assumed a thick putty-like consistency. Then 90 ml. of water was added slowly, with stirring, and after running the mixer at high speed for 5 minutes an extremely smooth gel of about 28% solids resulted, having a viscosity of 110 Brookfield units.

Using the foregoing procedure, gels were also prepared from the non-fibrous cellulose products identified in Example 3 as 1492–78, 1492–79, and 1492–80. Preparation of a gel was attempted with the material identified as 1492–85 but it was found to be too fibrous.

Samples of the gels formed from Samples No. 1492–14, No. 1492–78, No. 1492–79 and No. 1492–80 when placed on the tongue produced a smooth creamy sensation without producing a chalky mouth feel and without leaving a residual aftertaste or lingering sensation either before or after swallowing. A sample of the water-No. 1492–85 mixture when placed on the tongue produced a decided chalky or gritty mouth feel which persisted after swallowing.

Example 7

Salad dressing type products were prepared having the following compositions by weight:

| Ingredients | No. 1, Percent | No. 2, Percent |
|---|---|---|
| Non-fibrous cellulose | 15.63 | 15.0 |
| Soluble starch | | .46 |
| Sucrose | 5.90 | 9.49 |
| Salt | 1.38 | 2.00 |
| Dry mustard | 0.9 | .14 |
| Monosodium glutamate | 0.1 | .01 |
| Lecithin | | .18 |
| Cottonseed oil | 3.75 | 7.27 |
| Distilled vinegar | 6.25 | 9.09 |
| Lemon juice | .79 | 1.15 |
| Propylene glycol alginate | .19 | .27 |
| Water | 66.01 | 54.95 |
| Total | 100.00 | 100.00 |

In the case of No. 1, the non-fibrous cellulose, Sample No. 1492–18 of Example 2, was attrited in part of the water in a Model N–50 Hobart mixer for 25 minutes at 41% solids to form a doughy mass. The alginate was dispersed in the remaining water and added slowly to the dough for mixing. The mixture was then homogenized in a single orifice laboratory type homogenizer. The oil and a drop of polyoxyethylene sorbitan tristearate (Tween 65) were blended in, followed by addition of the mixed sugar, mustard, and glutamate. Finally the vinegar, lemon juice, and salt were added, with mixing. Even though the product contained 66 percent water, only a very slight amount of water was seen on the product surface after about 24 hours storage in a household refrigerator at about 38° F.

In the case of No. 2, salad dressing was prepared in like manner from Sample No. 1492–28B. The soluble starch was a high amylopectin, cold water-soluble starch made from waxy maize. The dry powder was attrited with 96 ml. water in the Hobart mixer for 25 minutes at 41% solids. Then the starch and the alginate were dispersed in the remaining amount of water, which was heated, and the mixture combined with the powder-water mass. The lecithin and oil were heated together and blended into the mixture followed by the addition of the sucrose and mustard. The mix was then homogenized, the vinegar, lemon juice, salt, and glutamate added, with mixing, and the resulting mixture homogenized. Upon storage in the refrigerator, it was observed to retain its excellent texture and taste over a period of more than 10 weeks during which time no surface water was seen.

Samples of both products when placed on the tongue had a smooth, creamy mouth feel comparable to commercial mayonnaise and did not produce a residual aftertaste or lingering sensation either before or after swallowing.

Example 8

The suspension and sedimentation behavior of a simple water slurry of the non-attrited non-fibrous cellulose was determined and compared with that of non-attrited materials prepared by the method of the aforementioned patent. Three dry powders were examined, identified as No. 1492-18, No. B-3 and No. P-55.

Sample No. 1492-28B was prepared according to the invention, having been used to make product No. 2 of Example 7. Sample No. B-3 was prepared by hydrolyzing Ketchikan sulfite wood pulp with a 0.5% aqueous HCl solution for one hour at 250° F. under pressure and washing and drying the residue. Sample No. P-55 was prepared by hydrolyzing Ketchikan sulfite wood pulp with a 0.5% aqueous HCl solution for 75 minutes at 260° F. and a pressure of 26 p.s.i.g. and washing and drying the residue. Sample Nos. B-3 and P-55 were prepared in the absence of a swelling inhibitor.

The samples were prepared for sediment and suspension determinations as follows: (a) slurries of each powder were made by mixing 355 ml. of water and 45 g. powder in a Waring Blendor for 3 minutes to form a slurry containing 11.2% by weight of solids; (b) a 134 g. portion of each slurry was weighed out and diluted with water to 1000 ml. in a graduated cylinder to form a slurry of about 1.5% solids content, followed by shaking such slurry vigorously and allowing the same to stand; (c) after 5 minutes the volume of sediment in the cylinder was noted; and (d) at the end of 1 hour the top 100 ml. portion was removed from the cylinder, evaporated to dryness in an oven equipped with air circulating means, and the weight of the dry residue recorded. The following results were noted:

| Sample No. | Sedimentation Volume, ml. | Weight of Residue, g. |
|---|---|---|
| 1492-28 B | 180 | 0.41 |
| B-3 | 200 | .28 |
| P-55 | 210 | .19 |

The residue weight is a direct measurement of the concentration of suspendable particles in the dilute slurry made from each material; in particular, it reflects the amount of particles reduced to a suspendable size and is a measure of the dispersibility of each material. The test illustrates that the product of this invention, Sample No. 1492-28B is 46% and 116% more dispersible, respectively, than Nos. B-3 and P-55.

Of further significance is the fact that visual examination of the top 100 ml. portions of No. 1492-28 and No. B-3, prior to evaporation, showed the former suspension to be opaque, whereas the latter was not, ranging from partially opaque to a translucent appearance.

The foregoing observations are reinforced by the sedimentation volume data, which are a measure of the nonsuspendable or settlable particles, and which show that No. 1492-28B has the least amount of settlable particles. It may be added that microscopic examination of the sediment of No. 1492-28B revealed no clumping of material, whereas No. B-3 contained clumps.

Example 9

The optical density of more dilute slurries of the same three non-attrited samples of the preceding example was determined in order to provide another measure of the dispersibility of the materials of the samples. Each dry powder was treated as follows: (a) 1 g. of the powder was mixed with 200 ml. distilled water and agitated for 15 seconds in a Waring Blendor to give a slurry of about 0.5 solids content; (b) the resulting slurry was transferred to a 250 ml. graduated cylinder and allowed to stand 16 hours; and (c) the top 10 ml. of the slurry was taken and the optical density determined with a Bausch and Lomb, Spectronic 20, spectrophotometer at 500 millimicrons. The following results were noted:

| Sample No.: | Optical density |
|---|---|
| 1492-28B | 0.168 |
| B-3 | .087 |
| P-55 | .052 |

The optical density, or O.D., is a measure of the light transmitted through the sample and is defined as the negative logarithm of the percent of transmitted light. As the O.D. increases, the amount of light transmitted by the material decreases, and the amount of light reflected and/or absorbed by the sample increases, thus showing an increasing concentration of particles. As the O.D. is a measure of suspendable particles, the concentrations of the suspended particles is a direct measure of the dispersibility of the materials. Thus, it will be seen that Sample No. 1492-28B, prepared according to the invention, had the highest O.D. and therefore the greatest concentration of suspendable particles and the greatest dispersibility. Percentage differences in O.D. were calculated, and on the foregoing basis, it was considered that No. 1492-28B is 93% and 223% more dispersible, respectively, than Nos. B-3 and P-55.

Example 10

The effect of attrition time on optical density was determined by using the same samples of the preceding example, namely, No. 1492-28B and No. P-55. Each of these materials was attrited in distilled water in the Hobart mixer at 35% solids concentration for a total time of 45 minutes. At intervals of 0, 5, 15, 25, 35, and 45 minutes, a portion of each material undergoing attrition was removed and subjected to the following procedure: (a) from such removed portion 2.86 g. (corresponding to 1.00 g. of solid material) were weighed out and placed in a 250 ml. graduated cylinder; (b) 200 ml. distilled water were added and the mixture shaken for 1 minute or until no sediment was visible at the bottom of the cylinder, after which the resulting dilute suspension was allowed to stand for 1 hour; and (c) the top 20 ml. of the suspension was removed, diluted with water to a volume of 100 ml., and an optical density determination was made on this diluted suspension. The results are as follows:

| | Optical Density | | | | | |
|---|---|---|---|---|---|---|
| Attrition time, min | 0 | 5 | 15 | 25 | 35 | 45 |
| Sample No.: | | | | | | |
| 1492-28B | 0.18 | 0.53 | 0.66 | 0.69 | 0.75 | 0.87 |
| P-55 | .04 | .47 | .49 | .47 | .43 | .38 |

As noted in the preceding example, the higher the O.D., the greater the concentration of suspended particles and the greater the dispersibility. The foregoing data show that with each material, the O.D. increases, reflecting the formation of smaller suspendable particles, but only in the case of Sample No. 1492-28B, is the increase continuous throughout the attrition period. In the other case, the O.D. reaches a maximum and then decreases, the decreasing O.D. showing that the number of small suspendable particles is decreasing, i.e., agglomeration is taking place. As there is no agglomeration with No. 1492–28B, within the time noted, this means that gels made from such material will not have any aftertaste resulting from the presence of agglomerates, and furthermore, the gel forming characteristics of the particles will not be lost owing to agglomeration. The data also show that prior to any attrition, No. 1492–28B has several times more suspendable particles than the other material. In terms of dispersibility, after 45 minutes of attrition, No. 1492–28B is 129% more dispersible than No. P–55. During attrition of the materials between 5 and 45 minutes attriting time, it was observed that No. 1492–28B resembled a gel whereas P–55 was in the form of a dry dough.

Example 11

The work of the preceding example was repeated except that the attrition of the materials was done in distilled water containing 200 p.p.m. (parts per million) of sodium chloride. Following are the results:

| | Optical Density | | | | | |
|---|---|---|---|---|---|---|
| Attrition time, min | 0 | 5 | 15 | 25 | 35 | 45 |
| Sample No.: | | | | | | |
| 1492–28B | 0.39 | 0.51 | 0.57 | 0.70 | 0.80 | |
| P–55 | .18 | .26 | .24 | .24 | .22 | |

Comparison of these data with the results of the preceding example shows that for both materials, the O.D. is reduced when the materials are attrited in the presence of the ionized salt. It is apparent that the ions favor the agglomeration of the particles. However, the decrease in O.D. for No. 1492–28B is far less than for the other material, showing that the material of this invention has high dispersibility even in the presence of $Na^+$ and $Cl^-$. Accordingly, the material is dispersible in foods that are seasoned with common salt or other ionizable compounds. Also, common tap water may be used to wash the hydrolysis residue and to make satisfactory gels therefrom. The data also show, as in the case of the preceding example, that there is a continuous increase in the production of the smaller sized particles on continued attrition in the case of Sample 1492–28B, whereas in the case of P–55 the rate of particle formation, after the initial rise, soon decreases. After 45 minutes of attrition, No. 1492–28B is 263% more dispersible than No. P–55.

The foregoing test was repeated except for two changes: (1) before attriting, the distilled water-salt solution was brought to a pH of 2.55 with acetic acid, and (2) the total attrition time was 7 minutes, with samples being removed for O.D. tests at the end of 3 and 7 minutes. The results are as follows: No. 1492–28B had an O.D. of 0.066 and 0.080 after 3 and 7 minutes, respectively, while No. P–55 had O.D.'s of 0.018 and 0.030, respectively. In terms of dispersibility, the former was 266% and 167% more dispersible than the latter. The experiment demonstrated the superior dispersibility in an acidic medium containing acetic acid and sodium chloride, as commonly encountered, for example, in salad dressings and mayonnaise.

Example 12

The drying characteristics of two materials of Example 9 were examined. Batches of Nos. 1492–28B and B–3 were prepared and, while still wet and prior to drying the same, were placed in an oven for two hours at 105° C. Equal amounts of materials were used having a solids content in the range of 25 to 35% by weight. The oven was equipped with air circulating means. It was observed that No. B–3 hornified; that is, the dried material was in the form of dense, tough, hard lumps having glossy surfaces and which were difficult to break. No. 1492–28B exhibited no hornification.

A sample of No. B–3 prepared by the hydrolysis method as described in Example 8 and in the aforementioned patent and spray dried was subjected to the hydrolytic degradation under the conditions described in Example 1 and oven dried at 105° C. The dried product, designated as No. B–3A, exhibited no hornification.

Samples of the oven dried products No. 1492–28B and No. B–3A when placed on the tongue produced a sensation of dissolving without producing a chalky mouth feel and without leaving a residual aftertaste or lingering sensation either before or after swallowing. A sample of the oven dried product B–3 when placed on the tongue did not appear to dissolve but remained as a granular or gritty material and even after swallowing left a sensation of the presence of foreign material.

Gels prepared from Samples No. 1492–28B and No. B–3A (15% solids-mixing in Mixmaster) when tasted had a smooth creamy texture, did not produce a chalky mouth feel and there was no residual aftertaste after swallowing. A gel prepared from Sample B–3 (15% solid-mixing in Waring Blendor) when tasted had an apparently smooth texture but produced a chalky mouth feel and produced a residual slightly chalky but noticeable and lingering sensation of the presence of a foreign material after swallowing.

Example 13

In a gel viscosity test, a 28% solids-containing gel prepared from No. 1492–28B according to the procedure of Example 6 had a viscosity of 110 Brookfield units. A gel prepared from No. B–3 to match this viscosity had a solids content of only 15% by weight, or 87% less than the first gel. Greater utilization of the former material is thus possible without increase in viscosity.

In another test, gels were prepared from No. P–55 and 1492–28B. In each case, a 50 g. sample of dry, powdered material was mixed with water to provide a mixture containing 35% solids, attrited for 3 minutes at a low speed in a Mixmaster device, then the speed increased and water added slowly until the surface of the resulting gel appeared to be creamy smooth, after which mixing was continued for an additional 3 minutes. In other words, both gels were made to the same creamy smoothness as determined simply by visual examination. Samples of each gel were then subjected to a Brookfield viscosity test and to moisture determinations, the latter being carried out on a Cenco moisture balance. Following are the results:

| | Water, percent | Solids, percent | Viscosity, Brookfield Units |
|---|---|---|---|
| Sample No.: | | | |
| P–55 | 83.0 | 17.0 | 85 |
| 1492–28B | 78.0 | 22.0 | 54 |

As will be apparent, No. 1492–28B contained 29% more solids than the other material while exhibiting a substantially lower viscosity.

To illustrate the effect of attrition time on viscosity, two mixtures were made up each containing 35% by weight of No. 1492–28B and the balance water. One mixture, identified as A, was attrited in a Hobart mixer at an intermediate speed for 25 minutes, diluted with water to a solids content of 15%, and then mixed in a Mixmaster device for 3 minutes at high speed. The resulting gel had a viscosity of 2500 centipoises. The second mixture, identified as B, was treated in the same way, except that the attrition time in the Hobart mixer was 180 minues; the viscosity of the resulting gel was 35,000 centipoises.

Gels may be prepared having a wide range of concentration, say from 3 to 45% by weight of the non-fibrous product and preferably 10 to 30%.

Besides wood pulp, and the hydrolysis product represented by Sample No. B–3, other cellulosic source materials were used, including regenerated cellulose staple fibers, alkali-treated cellulose, and ramie. Each of these were subjected to hydrolysis using the procedure of the invention, with acetic acid as the anti-swelling agent. When these products were examined under the microscope, the majority of the aggregates appeared to be less than 1 micron in size. A small mass of the dried products (size of a large pea) when placed on the tongue produced a sensation of dissolving without producing a chalky mouth feel and without leaving a residual aftertaste or lingering sensation either before or after swallowing.

Summarizing the results obtained, products prepared in accordance with the present invention by acid hydrolysis of a cellulosic source material in the presence of the swelling inhibitor are distinct from cellulose crystallite aggregates made in the absence of the swelling inhibitor in at least the following respects: there is a significantly greater removal of amorphous and mesocrystalline material; recrystallization is minimized; the non-fibrous cellulose particles are in a state of at least partially inhibited swelling; the particles are of a uniformly smaller particle size; fibrous particles are absent; the non-attrited material does not hornify on drying at temperatures up to at least 110° C.; slurries are obtainable having a greater contenet of suspendable particles and a smaller content of settlable particles; slurries and gels are obtainable having a higher optical density and therefore a greater dispersibiilty; the gels are without residual aftertaste; on attrition of the particles to form gels there is a continuous breakdown of particles over an attrition period of up to at least 45 minutes, such period comprising a conventional interval for gel formation; gels of higher solids content are obtainaable; and the gels have lower viscosities when compared on the basis of equal solids content.

In addition to their value in foods, the products of this invention are satisfactory for other uses to replace cellulose including such applications as adsorbents in chromatographic separation and purification processes as described in U.S. Patent No. 3,179,587, and in cosmetic and pharmaceutical preparations, as described in U.S. Patents No. 3,146,170 and No. 3,146,168.

The non-fibrous cellulose products which are free of amorphous and mesocrystalline forms of cellulose are polyglucose and are free of derivative groups in sharp contrast to cellulose products which are obtained by treatment of cellulose with a methanolic solution of hydrogen chloride. The latter treatment known as methanolysis results in the formation of a derivative of cellulose, namely, methyl glucoside. The method of the present invention does not produce a derivative of cellulose and no derivatization has been detectable upon analysis of the product.

I claim:

1. A method of producing a particulate non-fibrous cellulose product in a state of inhibited swelling which comprises subjecting a cellulosic source material containing at least 80% by weight of alpha-cellulose to the action of a hydrolyzing acid mixture, said hydrolyzing mixture comprising, by weight, per part of alpha-cellulose, 0.05 to 0.5 part of a non-derivatizing acid, water and 2.9 to 12 parts of at least one partially water-miscible, liquid, non-aqueous cellulose swelling inhibitor subsequently separating the mixture from the non-fibrous cellulose product and washing said non-fibrous cellulose product to remove acid and by-products therefrom, the cellulose swelling inhibitor being selected from the group consisting of non-aqueous oxygen-containing organic alcohols, ethers, esters, ketones, lactones, organic acids, polyols, glycol ethers and mixtures thereof.

2. A method of producing a particulate non-fibrous cellulose product which comprises subjecting a cellulosic source material containing at least 80% by weight of alpha-cellulose to the action of a hydrolyzing acid mixture at a temperature of 50° to 200° C., said hydrolyzing acid mixture comprising, by weight, per part of alpha-cellulose, 0.05 to 0.5 part of a non-derivatizing acid, 0.15 to 8 parts of water and 2.9 to 12 parts of at least one partially water-miscible, liquid, non-aqueous cellulose swelling inhibitor and which remains in the liquid state under the conditions of the reaction, the weight ratio of the swelling inhibitor to water being in the range of 0.3:1 to 60:1, forming, coincidently with a non-fibrous cellulose product, water-soluble and water-insoluble by-products which dissolve in the water and swelling inhibitor components, respectively, of said hydrolyzing mixture; separating the mixture from the non-fibrous cellulose product; and washing said non-fibrous cellulose product to remove acid and by-products therefrom, the cellulose swelling inhibitor being selected from the group consisting of non-aqueous oxygen-containing organic alcohols, ethers, esters, ketones, lactones, organic acids, polyols, glycol ethers and mixtures thereof.

3. A method as defined in claim 2 wherein the washed non-fibrous cellulose product is air dried at a temperature of up to about 110° C. and recovering directly from said drying step a non-fibrous cellulose product in discrete, particulate, non-horified form.

4. A method as defined in claim 2 wherein the hydrolyzing acid mixture comprises, by weight, per part of alpha-cellulose, 0.15 to 0.5 part of a non-derivatizing acid, 0.2 to 7 parts of water and 3 to 11 parts of a cellulose swelling inhibitor and the weight ratio of the cellulose swelling inhibitor is in the range of 0.5:1 to 33:1 and the temperature is maintained between 50° and 90° C.

5. A method as defined in claim 1 wherein the non-derivatizing acid is hydrochloric acid and the cellulose swelling inhibitor is isopropanol.

6. A method as defined in claim 1 wherein the non-derivatizing acid is hydrochloric acid and the cellulose swelling inhibitor is acetic acid.

7. Particulate, non-fibrous cellulose consisting essentially of polyglucose, being readily frangible, being substantially free of derivative groups and amorphous and mesocrystalline forms of cellulose, and formed in accordance with the method as defined in claim 1.

References Cited

UNITED STATES PATENTS

| | | | |
|---|---|---|---|
| 3,023,104 | 2/1962 | Battista | 99—1 |
| 2,978,446 | 4/1961 | Battista et al. | 260—212 |
| 1,964,772 | 7/1934 | Schur et al. | 260—212 |

DONALD E. CZAJA, *Primary Examiner.*

R. W. MULCAHY, *Assistant Examiner.*

UNITED STATES PATENT OFFICE
CERTIFICATE OF CORRECTION

Patent No. 3,388,119                      June 11, 1968

Mamerto M. Cruz, Jr.

It is certified that error appears in the above identified patent and that said Letters Patent are hereby corrected as shown below:

Column 13, line 21, "contenet" should read -- content --; line 24, "dispersibiilty" should read -- dispersibility --; line 29, "obtainaable" should read -- obtainable --; line 57, after "acid," insert -- 0.15 to 8 parts of --.

Signed and sealed this 21st day of October 1969.

(SEAL)

Attest:

Edward M. Fletcher, Jr.                      WILLIAM E. SCHUYLER, JR.

Attesting Officer                              Commissioner of Patents